(12) United States Patent
Kim

(10) Patent No.: US 11,828,505 B2
(45) Date of Patent: Nov. 28, 2023

(54) GAS INJECTION TYPE HEAT MANAGEMENT SYSTEM FOR VEHICLE

(71) Applicants: HYUNDAI MOTOR COMPANY, Seoul (KR); KIA CORPORATION, Seoul (KR)

(72) Inventor: Jong Won Kim, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/946,291

(22) Filed: Sep. 16, 2022

(65) Prior Publication Data

US 2023/0204268 A1 Jun. 29, 2023

(30) Foreign Application Priority Data

Dec. 27, 2021 (KR) .................. 10-2021-0188576

(51) Int. Cl.
*F25B 41/42* (2021.01)
*B60H 1/00* (2006.01)
(Continued)

(52) U.S. Cl.
CPC ......... *F25B 41/42* (2021.01); *B60H 1/00899* (2013.01); *B60H 1/32* (2013.01);
(Continued)

(58) Field of Classification Search
CPC .. F25B 41/42; F25B 41/20; F25B 2400/0417; F25B 2400/0403; F25B 2600/2513;
(Continued)

(56) References Cited

U.S. PATENT DOCUMENTS

| 6,941,770 | B1* | 9/2005 | Taras ................. | F24F 3/153 |
| | | | | 62/196.4 |
| 9,062,903 | B2* | 6/2015 | Sjoholm ............. | F25B 1/00 |
| 10,155,430 | B2 | 12/2018 | Suzuki et al. | |
| 10,843,528 | B2* | 11/2020 | Tan .................... | B60H 1/22 |

(Continued)

FOREIGN PATENT DOCUMENTS

| JP | 2009-127939 A | | 6/2009 |
| JP | 2010112582 A | * | 5/2010 |

(Continued)

*Primary Examiner* — Kun Kai Ma
(74) *Attorney, Agent, or Firm* — MCDONNELL BOEHNEN HULBERT & BERGHOFF LLP

(57) ABSTRACT

A gas injection-type heat-management system includes a base flow path sequentially provided with a compressor, an inner condenser, a heat exchanger, a first expansion valve, an outer condenser, a second expansion valve, and an evaporator, a heat exchange flow path branched from the base flow path at an upstream point of the heat exchanger, disposed to be heat-exchangeable with the base flow path in the heat exchanger by passing through a third expansion valve, and joined to the base flow path on the compressor or at an upstream point thereof, a first bypass flow path connected to the base flow path, a second bypass flow path connected to the base flow path, and a recirculation flow path branched from the base flow path at a downstream point of the outer condenser and joined to the heat exchange flow path at an upstream point of the third expansion valve.

12 Claims, 16 Drawing Sheets

(51) Int. Cl.
*F25B 1/10* (2006.01)
*B60H 1/32* (2006.01)
*F25B 41/20* (2021.01)

(52) U.S. Cl.
CPC ............... *F25B 1/10* (2013.01); *F25B 41/20* (2021.01); *B60H 2001/3286* (2013.01)

(58) Field of Classification Search
CPC .... F25B 5/04; F25B 6/04; F25B 40/02; F25B 41/39; F25B 49/02; F25B 2400/0401; F25B 2400/13; B60H 1/00899; B60H 1/32; B60H 2001/3286; B60H 1/3223; B60H 1/3228; B60H 2001/00307; B60H 2001/3291; B60H 1/00921; B60H 1/3213
See application file for complete search history.

(56) References Cited

U.S. PATENT DOCUMENTS

| | | | |
|---|---|---|---|
| 2009/0025405 A1* | 1/2009 | Yanik | F28D 1/0408 62/509 |
| 2009/0293515 A1* | 12/2009 | Lifson | F25B 30/02 418/55.1 |
| 2019/0070924 A1 | 3/2019 | Mancini et al. | |
| 2021/0061067 A1* | 3/2021 | Kim | B60H 1/00921 |

FOREIGN PATENT DOCUMENTS

| | | |
|---|---|---|
| JP | 2019-219121 A | 12/2019 |
| JP | 2020-139641 A | 9/2020 |
| KR | 10-2039173 B1 | 10/2019 |
| KR | 2021-0002848 A | 1/2021 |

* cited by examiner

GAS INJECTION TYPE HEAT MANAGEMENT SYSTEM FOR VEHICLE

CROSS REFERENCE TO RELATED APPLICATIONS

The present application claims priority of Korean Patent Application No. 10-2021-0188576 filed on Dec. 27, 2021, the entire contents of which is incorporated herein for all purposes by this reference.

BACKGROUND

Field of the Disclosure

The present disclosure relates to a gas injection type heat management system for a vehicle, and more specifically, to a gas injection type heat management technology for a vehicle, which applies a heat exchanger to improve heating and cooling performance compared to a conventional cycle.

Description of the Related Art

Recently, an electric vehicle, etc. have been widely distributed as an eco-friendly vehicle due to an environmental issue of an internal combustion engine vehicle. However, the conventional internal combustion engine vehicle does not require a separate heating energy because the interior may be heated through the waste heat of the engine, but the electric vehicle has a problem in that the heating is performed through separate energy because the electric vehicle, etc. does not have an engine and a heating source, thereby reducing fuel efficiency. In addition, it is true that this gives inconvenience such as shortening the distance to empty (DTE) of the electric vehicle and requiring frequent charging.

Meanwhile, the heat management of electric components such as a high voltage battery and a motor as well as a vehicle interior have been newly additionally needed due to motorization of the vehicle. In other words, in the electric vehicle, air conditioning for each of the interior space, the battery, and the electric components is differently needed, and there is a need for a technology capable of saving the energy as much as possible by responding independently to and efficiently collaborating with them. Therefore, an integrated heat management concept of a vehicle is being presented to increase heat efficiency by integrating the entire heat management of the vehicle while performing the heat management independently for each configuration.

In order to perform this integrated heat management of the vehicle, it is necessary to integrate and modularize complex coolant lines and components, and there is a need for a concept of modularization that is simple to manufacture even while modularizing a plurality of components and is compact even in terms of package.

Meanwhile, recently, research to increase the efficiency of a heat pump in the electric vehicle is being actively conducted.

One method of increasing the efficiency of the heat pump is a gas injection type heat pump. The gas injection type heat pump is a method of increasing a flow rate of the refrigerant circulated while heating using a heat exchanger (H/X) and a flash tank, thereby increasing the heating efficiency of the vehicle.

FIG. 1 is a circuit diagram of a gas injection type heat pump cycle to which a heat exchanger according to the related art is applied.

Referring to FIG. 1, a gas injection type heat pump cycle to which a heat exchanger according to the related art is applied may have a cycle in which the refrigerant discharged from a compressor is branched to exchange heat between the refrigerant having passed an expansion valve and the refrigerant before passing through the expansion valve in a heat exchanger and then the heat-exchanged refrigerant flows into the compressor, thereby additionally securing the flow rate of the refrigerant while heating to increase the amount of heating capacity.

However, there is a problem in that this heat pump cycle according to the related art may be used only while heating, and the components related to the gas injection including the heat exchanger may not be used while cooling.

The matters explained as the background art are for the purpose of enhancing the understanding of the background of the present disclosure and should not be taken as acknowledging that they correspond to the related art already known to those skilled in the art.

SUMMARY

The present disclosure has been proposed to solve the above problem, and an object of the present disclosure is to provide a technology about a gas injection type heat management system for a vehicle, which uses a gas injection type heat pump cycle even while cooling, thereby improving the heating and cooling performance compared to the conventional cycle.

In order to achieve the object, a gas injection type heat management system for a vehicle according to the present disclosure includes a base flow path sequentially provided with a compressor, an inner condenser, a heat exchanger, a first expansion valve, an outer condenser, a second expansion valve, and an evaporator to flow refrigerant, a heat exchange flow path branched from the base flow path at an upstream point of the heat exchanger, disposed to be heat-exchangeable with the base flow path in the heat exchanger by passing through a third expansion valve, and joined to the base flow path on the compressor or at an upstream point of the compressor, a first bypass flow path connected to the base flow path to bypass the inner condenser between upstream and downstream points of the inner condenser, a second bypass flow path connected to the base flow path to bypass the heat exchanger between the upstream point and a downstream point of the heat exchanger, and a recirculation flow path branched from the base flow path at a downstream point of the outer condenser and joined to the heat exchange flow path at an upstream point of the third expansion valve.

The gas injection type heat management system may further include a gas-liquid separator provided between the evaporator and the compressor of the base flow path to separate the refrigerant into a gaseous state and a liquid state, and the heat exchange flow path may be branched to the gas-liquid separator and the compressor and joined to the base flow path.

The compressor may be a 2-stage compressive compressor in which the gaseous state refrigerant is additionally injected into a compression intermediate region to mix the refrigerant, and the heat exchange flow path may be connected to the compressor so that the refrigerant is additionally injected to the compression intermediate region.

The gas injection type heat management system may further include a first flow path valve provided at a point branched to the compressor and the upstream point of the compressor of the heat exchange flow path to adjust the presence or absence of the flow or the flow rate of the refrigerant each flowing into the compressor and the upstream point of the compressor, a second flow path valve provided at a point branched from the base flow path to the first bypass flow path or a point where the first bypass flow path is joined to the base flow path to adjust the presence or absence of the flow or the flow rate of the refrigerant flowing into the first bypass flow path, a third flow path valve provided at a point branched from the base flow path to the second bypass flow path or a point where the second bypass flow path is joined to the base flow path to adjust the presence or absence of the flow or the flow rate of the refrigerant each flowing into the second bypass flow path, and a fourth flow path valve provided at a point where the recirculation flow path is joined to the heat exchange flow path to adjust the presence or absence of the flow or the flow rate of the refrigerant flowing through the heat exchange flow path or the refrigerant flowing from the recirculation flow path to the heat exchange flow path.

The gas injection type heat management system may further include a controller configured to control the operation of the compressor, control whether the refrigerant flows or expands by adjusting an opening amount of the first expansion valve, the second expansion valve, or the third expansion valve, and adjust the presence or absence of the flow or the flow rate of the refrigerant in the base flow path, the heat exchange flow path, the first bypass flow path, the second bypass flow path, or the recirculation flow path by adjusting an opening amount of the first flow path valve, the second flow path valve, the third flow path valve, or the fourth flow path valve.

In a general heating mode, the controller may dissipate heat in an inner condenser by adjusting the opening amount of the first flow path valve, the second flow path valve, the third flow path valve, or the fourth flow path valve to block the refrigerant of the base flow path from flowing into the second bypass flow path and flowing into the recirculation flow path, the first bypass flow path, or the heat exchange flow path while the refrigerant is circulated in the base flow path.

In a gas injection heating mode, the controller may increase the flow rate of the refrigerant flowing into the inner condenser by adjusting the opening amount of the first flow path valve, the second flow path valve, the third flow path valve, or the fourth flow path valve so that the refrigerant of the base flow path flows into the compressor through the heat exchange flow path while the refrigerant is circulated in the base flow path.

In a general cooling mode, the controller may absorb heat in the evaporator while dissipating the heat in the outer condenser by adjusting the opening amount of the first flow path valve, the second flow path valve, the third flow path valve, or the fourth flow path valve so that the refrigerant of the base flow path flows into the first bypass flow path while the refrigerant is circulated in the base flow path.

In a first liquid injection cooling mode, the controller may reduce the temperature of the refrigerant flowing into the compressor by adjusting the opening amount of the first flow path valve, the second flow path valve, the third flow path valve, or the fourth flow path valve so that the refrigerant of the base flow path flows into the first bypass flow path and the second bypass flow path and flows into an upstream point of the compressor through the recirculation flow path and the heat exchange flow path while the refrigerant is circulated in the base flow path.

In a second liquid injection cooling mode, the controller may reduce a compression ratio of the compressor by adjusting the opening amount of the first flow path valve, the second flow path valve, the third flow path valve, or the fourth flow path valve so that the refrigerant of the base flow path flows into the first bypass flow path and the second bypass flow path and flows into the compressor through the recirculation flow path and the heat exchange flow path while the refrigerant is circulated in the base flow path.

In a first sub-cooling cooling mode, the controller may super-cool the refrigerant by adjusting the opening amount of the first flow path valve, the second flow path valve, the third flow path valve, or the fourth flow path valve so that the refrigerant of the base flow path flows into the first bypass flow path and flows into the compressor through the recirculation flow path and the heat exchange flow path while the refrigerant is circulated in the base flow path.

In a second sub-cooling cooling mode, the controller may super-cool the refrigerant by adjusting the opening amount of the first flow path valve, the second flow path valve, the third flow path valve, or the fourth flow path valve so that the refrigerant of the base flow path flows into the first bypass flow path and flows into an upstream point of the compressor through the recirculation flow path and the heat exchange flow path while the refrigerant is circulated in the base flow path.

According to the gas injection type heat management system for the vehicle according to the present disclosure, it is possible to apply the gas injection while the vehicle interior is heated, thereby improving the interior heating performance.

In addition, it is possible to apply the liquid injection while the vehicle interior is cooled to improve the interior cooling performance, thereby reducing the load of the entire system.

In addition, it is possible to secure the additional super-cooling degree while the vehicle interior is cooled, thereby improving the interior cooling performance.

BRIEF DESCRIPTION OF THE FIGURES

The above and other objects, features and other advantages of the present disclosure will be larger clearly understood from the following detailed description when taken in conjunction with the accompanying drawings, in which.

DETAILED DESCRIPTION

Figure 1:
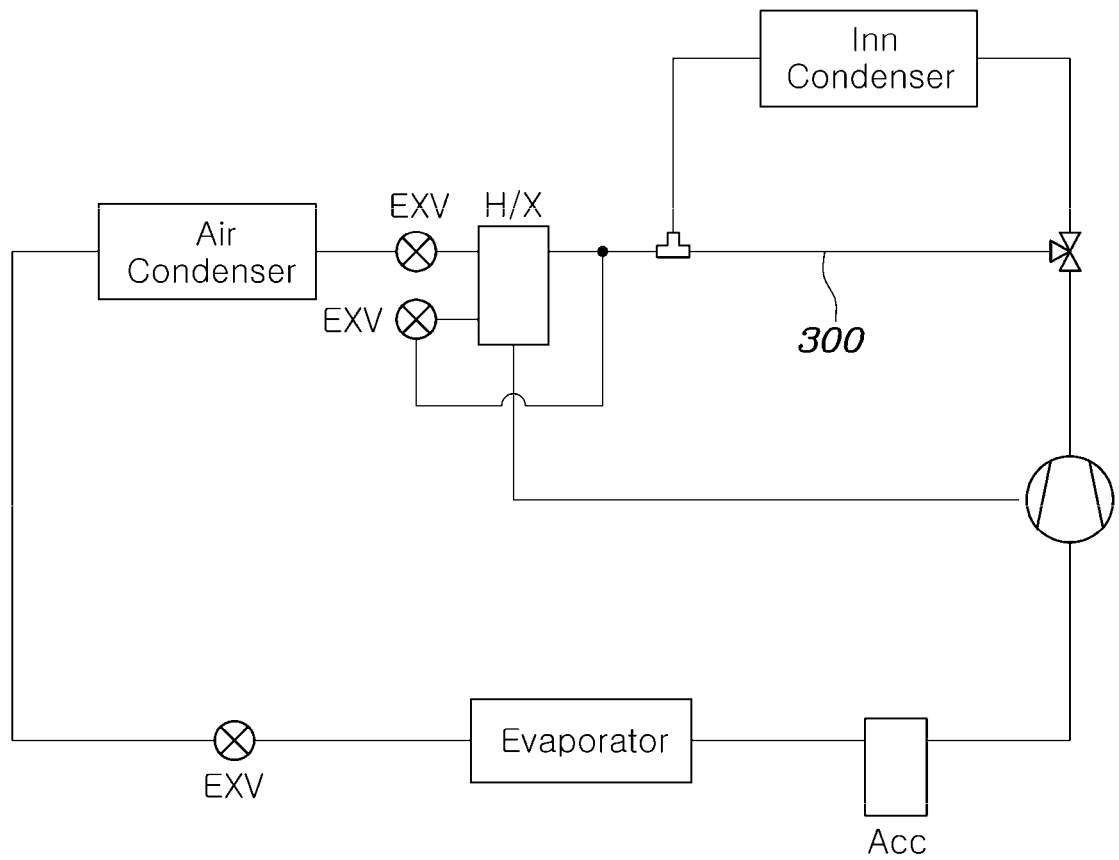
FIG. 1 is a circuit diagram of a gas injection type heat pump cycle to which a heat exchanger according to the related art is applied.

Specific structural or functional descriptions for exemplary embodiments of the present disclosure disclosed in the present specification or application are only exemplified for the purpose of describing the exemplary embodiments according to the present disclosure, and the exemplary embodiments according to the present disclosure may be carried out in various forms and should not be interpreted as being limited to the exemplary embodiments described in the present specification or application.

Since the exemplary embodiment according to the present disclosure may have various changes and have various forms, specific exemplary embodiments will be shown in the drawings and described in detail in the present specification or application. However, this is not intended to limit the exemplary embodiments according to the concept of the present disclosure to a specific disclosed form, and should be understood to include all changes, equivalents, or substitutes included in the spirit and technical scope of the present disclosure.

Terms such as first and/or second may be used to describe various components, but the components should not be limited to the terms. The terms are used only for the purpose of distinguishing one component from other components, and for example, a first component may be referred to as a second component, and similarly, the second component may also be referred to as the first component, without departing from the scope according to the concept of the present disclosure.

When a certain component is said to be "connected" or "coupled" to another component, it should be understood that the certain component may be directly connected or coupled to another component, but other components may also exist therebetween. On the other hand, when a certain component is said to be "directly connected to" or "directly coupled to" another component, it should be understood that other components do not exist therebetween. Other expressions for describing the relationship between components, that is, expressions such as "between" and "directly between" or "adjacent to" and "directly adjacent to" should also be interpreted in the same manner.

The terms used in the present specification are only used to describe the specific exemplary embodiments and are not intended to limit the present disclosure. The singular expression also includes the plural expression unless otherwise specified in the context. It should be understood that terms such as "comprises" or "has" used in the present specification specify the presence of the practiced feature, number, step, operation, component, part, or a combination thereof, and do not exclude the presence or addition possibility of one or more other features, numbers, steps, operations, components, parts, or a combination thereof in advance.

Unless defined otherwise, all terms used herein, including technical or scientific terms, have the same meaning as commonly understood by those skilled in the art to which the present disclosure pertains. Terms such as those defined in commonly used dictionaries should be interpreted as having meanings consistent with the meanings in the context of the related art, and are not interpreted as an ideal or excessively formal meaning unless explicitly defined in the present specification.

Hereinafter, the present disclosure will be described in detail by describing preferred exemplary embodiments of the present disclosure with reference to the accompanying drawings. The same reference numerals presented in each drawing indicate the same members.

Research on which an ejector or an injection is applied is being actively conducted for high performance of a refrigeration cycle.

A refrigeration cycle to which the conventional ejector is applied has a structure of flowing the refrigerant condensed by a condenser to a gas-liquid separator by a compression recovery function using the venturi effect of the ejector and circulating the liquid refrigerant through an expansion valve and an evaporator. Therefore, it is possible to reduce the consumed power (work) of the compressor and increase the flow rate of the refrigerant compared to a general refrigeration cycle. However, the refrigeration cycle to which the conventional ejector is applied has a problem in that it is difficult to secure the flow rate of an additional refrigerant in a low-temperature state.

The refrigeration cycle to which the injection is applied is classified into a gas injection and a liquid injection.

The refrigeration cycle to which the gas injection is applied flows the refrigerant to an evaporator through a 2-stage expansion process and injects a gaseous refrigerant of an intermediate pressure primarily expanded into a compressor. Therefore, it is possible to increase the flow rate of the refrigerant flowing into an outer condenser, or an inner condenser and the compressor, and to improve the compression effect by the 2-stage compression to reduce the consumed power of the compressor. In particular, it is possible to solve a reduction in performance of the refrigeration cycle in cold and tropical areas.

On the other hand, the refrigeration cycle to which the liquid injection is applied may prevent overheating of the compressor and at the same time, additionally increase the flow rate of the refrigerant by absorbing the heat consumption of the compressor.

Specifically, the heat exchanger type separates a part of the refrigerant on a rear end of the outer condenser or the inner condenser and exchanges heat with the refrigerant of the intermediate pressure primarily expanded. Therefore, it is possible to reduce the dryness of the refrigerant flowing into the evaporator by secondarily expanding the refrigerant while vaporizing the separated refrigerant.

In addition, the flash tank type expands the entire refrigerant on the rear end of the outer condenser or the inner condenser, and then separates the gaseous refrigerant and the liquid refrigerant to flow the gaseous and liquid refrigerant into the compressor and a secondary expansion valve, respectively. Therefore, it is possible to reduce the dryness of the refrigerant flowing into the evaporator by separating the liquid refrigerant to secondarily expand the liquid refrigerant.

Figure 2:
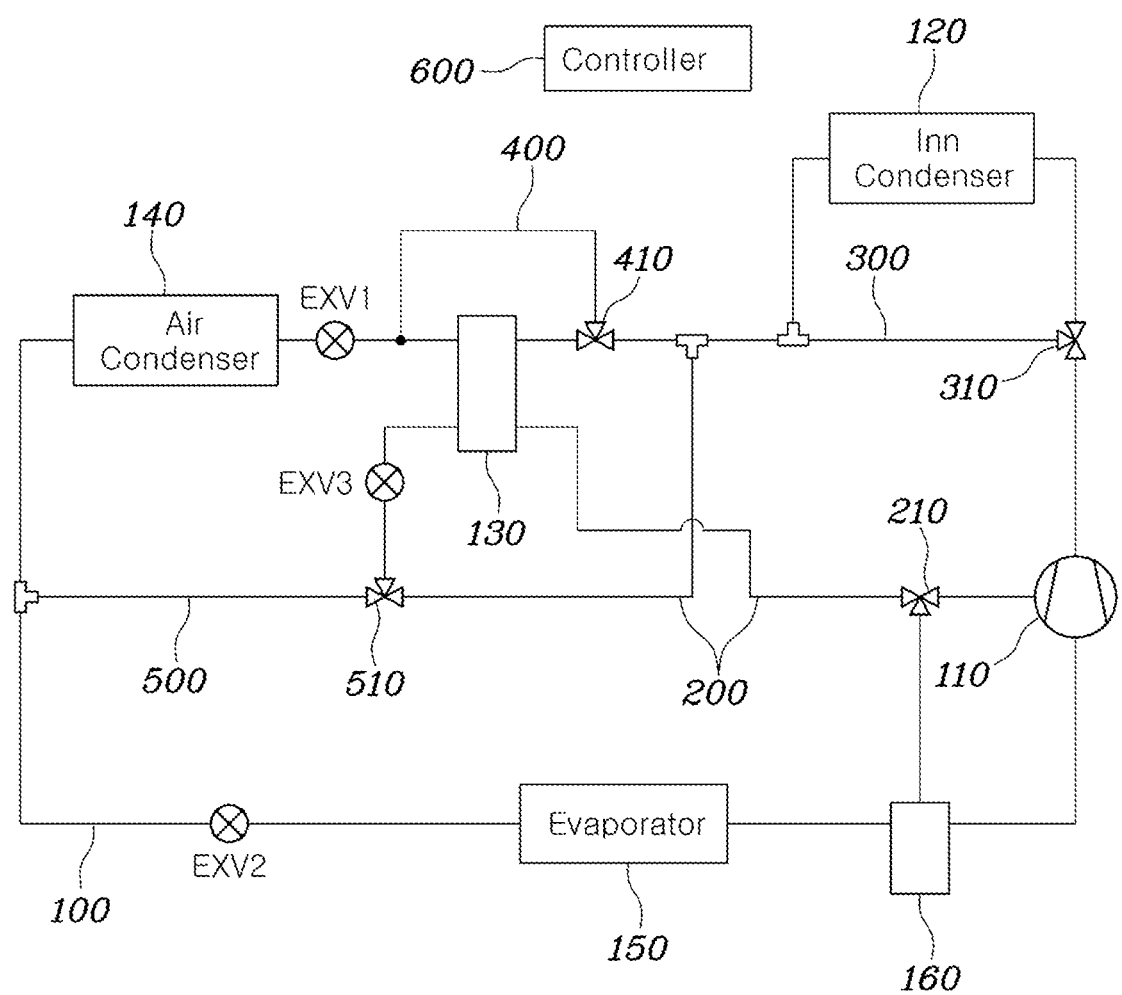
FIG. 2 is a circuit diagram of a gas injection type heat management system for a vehicle according to an exemplary embodiment of the present disclosure.

FIG. 2 is a circuit diagram of a gas injection type heat management system for a vehicle according to an exemplary embodiment of the present disclosure.

Referring to FIG. 2, a gas injection type heat management system 110 for a vehicle according to an exemplary embodiment of the present disclosure includes a base flow path 100 sequentially provided with a compressor 110, an inner condenser 120, a heat exchanger 130, a first expansion valve EXV1, an outer condenser 140, a second expansion valve EXV2, and an evaporator 150 to flow refrigerant. A heat exchange flow path 200 is branched from the base flow path 100 at an upstream point of the heat exchanger 130, disposed to be heat-exchangeable with the base flow path 100 in the heat exchanger 130 by passing through a third expansion valve EXV3, and joined to the base flow path 100 on the compressor 110 or at an upstream point of the compressor 110, and a first bypass flow path 300 connected to the base flow path 100 to bypass the inner condenser 120 between upstream and downstream points of the inner condenser 120. The system further includes a second bypass flow path 400 connected to the base flow path 100 to bypass the heat exchanger 130 between the upstream point and a downstream point of the heat exchanger 130, and a recirculation flow path 500 branched from the base flow path 100 on a downstream point of the outer condenser 140 and joined to the heat exchange flow path 200 on an upstream point of the third expansion valve EXV3.

The gas injection type heat management system for the vehicle according to the exemplary embodiment of the present disclosure is a refrigeration cycle using the heat exchanger 130 type gas injection, and more specifically, uses the gas injection while an interior is heated and uses a liquid injection while the interior is cooled, thereby improving the heating and cooling performance and increasing the use of the heat management system.

Specifically, the base flow path 100 may be a refrigerant circuit of the general refrigeration cycle. The refrigerant compressed by the compressor 110 in the high-temperature/high-pressure flows to the inner condenser 120 to heat the interior, and the refrigerant having passed through the inner condenser 120 sequentially flows to the first expansion valve EXV1 and the outer condenser 140 through the heat exchanger 130 to absorb heat. In addition, the refrigerant secondarily expanded while passing through the second expansion valve EXV2 may absorb heat in the evaporator 150 and therefore, be circulated back to the compressor 110 in a state of being evaporated to a gaseous state.

The outer condenser 140 may be exposed to the outside of the vehicle, and the inner condenser 120 and the evaporator 150 may be positioned inside an air-conditioning line of the vehicle.

The heat exchange flow path 200 may be branched from the base flow path 100 at the upstream point of the heat exchanger 130 to extend to be joined to the base flow path 100 on the compressor 110 or at an upstream point of the compressor 110, and the third expansion valve EXV3 and the heat exchanger 130 may be provided therebetween.

The heat exchanger 130 may be a device in which the base flow path 100 and the heat exchange flow path 200 are disposed to be heat-exchangeable with each other, and may be a device for activating the heat exchange with each other while the refrigerant therein flows to each flow path not to be mixed with each other.

The first bypass flow path 300 is connected to the base flow path 100 to bypass the inner condenser 120 between the upstream and downstream points of the inner condenser 120, and is a flow path for bypassing the inner condenser 120 in case of not a vehicle interior heating mode. The first bypass flow path 300 may be connected to the base flow path 100 to be branched or joined through a 3-Way valve.

The second bypass flow path 400 is connected to the base flow path 100 to bypass the heat exchanger 130 between the upstream point of the heat exchanger 130 and the downstream point of the heat exchanger 130 and may bypass the heat exchanger 130 to heat-dissipate the high-temperature/high-pressure refrigerant discharged from the compressor 110 in the outer condenser 140 while the vehicle interior is cooled.

In particular, the second bypass flow path 400 may be branched at a downstream point of a point branched from the base flow path 100 to the heat exchange flow path 200 and joined at an upstream point of the first expansion valve EXV1.

The recirculation flow path 500 may be branched from the base flow path 100 at a downstream point of the outer condenser 140 and joined to the heat exchange flow path 200. In particular, the recirculation flow path 500 may be joined at the upstream point of the third expansion valve EXV3 through the 3-Way valve to selectively flow the refrigerant flowing from the upstream point of the heat exchanger 130 of the base flow path 100 and the refrigerant flowing from the downstream point of the outer condenser 140 of the base flow path 100 through the recirculation flow path 500 to the third expansion valve EXV3 and the heat exchanger 130.

Therefore, according to the gas injection type heat management system for the vehicle according to the present disclosure, it is possible to apply the gas injection to the heating of the vehicle interior and apply the liquid injection while the interior is cooled using the configuration of the heat exchanger 130, etc.

The gas injection type heat management system for the vehicle according to the present disclosure may further include a gas-liquid separator 160 provided between the evaporator 150 and the compressor 110 of the base flow path 100 to separate the refrigerant into the gaseous state and the liquid state, and the heat exchange flow path 200 may be branched to the gas-liquid separator 160 and the compressor 110 and joined to the base flow path 100.

The gas-liquid separator 160 may separate the refrigerant discharged after absorbing heat in the evaporator 150 into the gaseous state and the liquid state and supply only the gaseous state refrigerant to the compressor 110. In addition, the heat exchange flow path 200 may be branched into two branches while passing through the heat exchanger 130, one of which may be connected to the gas-liquid separator 160 positioned at the upstream point of the compressor 110, and the other of which may be connected to the compressor 110 and joined to the base flow path 100.

The compressor 110 is a two-stage compressive compressor 110 in which the gaseous state refrigerant is additionally injected into a compression intermediate region to mix the refrigerant, and the heat exchange flow path 200 may be connected to the compressor 110 so that the refrigerant is additionally injected into the compression intermediate region.

The compressor 110 is the two-stage compressive compressor 110 formed with an injection port into which the gaseous state refrigerant of the intermediate pressure is injected into the compression intermediate region separately from an inlet port into which the refrigerant is introduced to mix the refrigerant.

In other words, when the refrigerant flowing through the heat exchange flow path 200 flows into the upstream point of the compressor 110, the refrigerants in the base flow path 100 and the heat exchange flow path 200 may be mixed to flow into the inlet port of the compressor 110, and when the refrigerant flows into the compressor 110 through the heat exchange flow path 200, the refrigerant may be additionally injected into the compression intermediate region through the injection port.

The gas injection type heat management system for the vehicle according to the present disclosure may further include a first flow path valve 210 provided at a point branched to the compressor 110 and the upstream point of the compressor 110 of the heat exchange flow path 200 to adjust the presence or absence of the flow or the flow rate of the refrigerant each flowing into the compressor 110 and the upstream point of the compressor 110, a second flow path valve 310 provided at a point branched from the base flow path 100 to the first bypass flow path 300 or a point where the first bypass flow path 300 is joined to the base flow path 100 to adjust the presence or absence of the flow or the flow rate of the refrigerant flowing into the first bypass flow path 300, a third flow path valve 410 provided at a point branched from the base flow path 100 to the second bypass flow path 400 or a point where the second bypass flow path 400 is joined to the base flow path 100 to adjust the presence or absence of the flow or the flow rate of the refrigerant flowing into the second bypass flow path 400, and a fourth flow path valve 510 provided at a point where the recirculation flow path 500 is joined to the heat exchange flow path 200 to adjust the presence or absence of the flow or the flow rate of the refrigerant flowing through the heat exchange flow path 200 or the refrigerant flowing from the recirculation flow path 500 into the heat exchange flow path 200.

The first flow path valve 210, the second flow path valve 310, the third flow path valve 410, and the fourth flow path valve 510 may be the 3-Way valves. The first flow path valve 210 may adjust the presence or absence of the flow or the flow rate of the refrigerant branched to the upstream point of the compressor 110 and the compressor 110 from the refrigerant flowing into the heat exchange flow path 200, and the second flow path valve 310 and the third flow path valve 410 may adjust the presence or absence of the flow or the flow rate of the refrigerant each branched to the first bypass flow path 300 and the second bypass flow path 400 from the base flow path 100. In addition, the fourth flow path valve 510 may adjust the presence or absence of the flow or the flow rate of the refrigerant flowing through the heat exchange flow path 200 from the base flow path 100 and the refrigerant flowing into the heat exchange flow path 200 from the recirculation flow path 500.

The gas injection type heat management system for the vehicle according to the present disclosure may further include a controller 600 configured to control the operation of the compressor 110, control whether the refrigerant flows or expands by adjusting an opening amount of the first expansion valve EXV1, the second expansion valve EXV2, or the third expansion valve EXV3, and adjust the presence or absence of the flow or the flow rate of the refrigerant in the base flow path 100, the heat exchange flow path 200, the first bypass flow path 300, the second bypass flow path 400, or the recirculation flow path 500 by adjusting an opening amount of the first flow path valve 210, the second flow path valve 310, the third flow path valve 410, or the fourth flow path valve 510.

The controller 600 according to the exemplary embodiment of the present disclosure may be implemented through a non-volatile memory (not shown) configured to store data about an algorithm configured to control the operations of various components for the vehicle or software commands for playing the algorithm and a processor (not shown) configured to perform the operation described below using the data stored in the corresponding memory. Here, the memory and the processor may be implemented as separate chips. Alternatively, the memory and the processor may be implemented as a single chip integrated with each other. The processor may take the form of one or more processors.

The controller 600 may control so that the first expansion valve EXV1, the second expansion valve EXV2, and the third expansion valve EXV3 flow, expand, or block the refrigerant by adjusting the opening amounts of the first expansion valve EXV1, the second expansion valve EXV2, and the third expansion valve EXV3.

In addition, the controller 600 may control so that the first flow path valve 210, the second flow path valve 310, the third flow path valve 410, and the fourth flow path valve 510 flow the refrigerant, or adjust or block the flow rate thereof from the base flow path 100 into the heat exchange flow path 200, the first bypass flow path 300, the second bypass flow path 400, and the recirculation flow path 500 by adjusting the opening amounts of the first flow path valve 210, the second flow path valve 310, the third flow path valve 410, and the fourth flow path valve 510.

Figure 3:
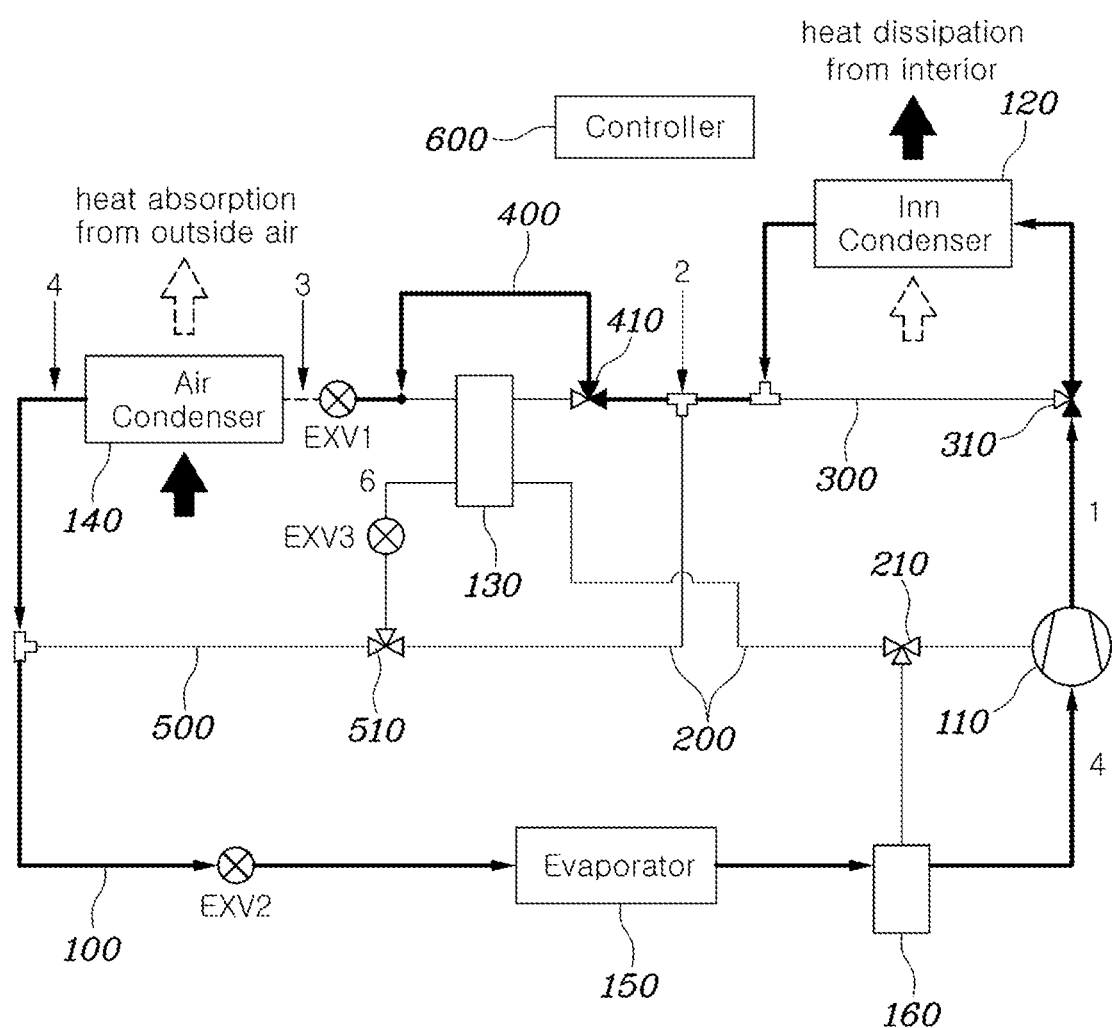
FIGS. 3 and 4 show a circuit diagram and a P-h line diagram according to a general heating mode of the gas injection type heat management system for the vehicle according to the exemplary embodiment of the present disclosure.
Figure 4:
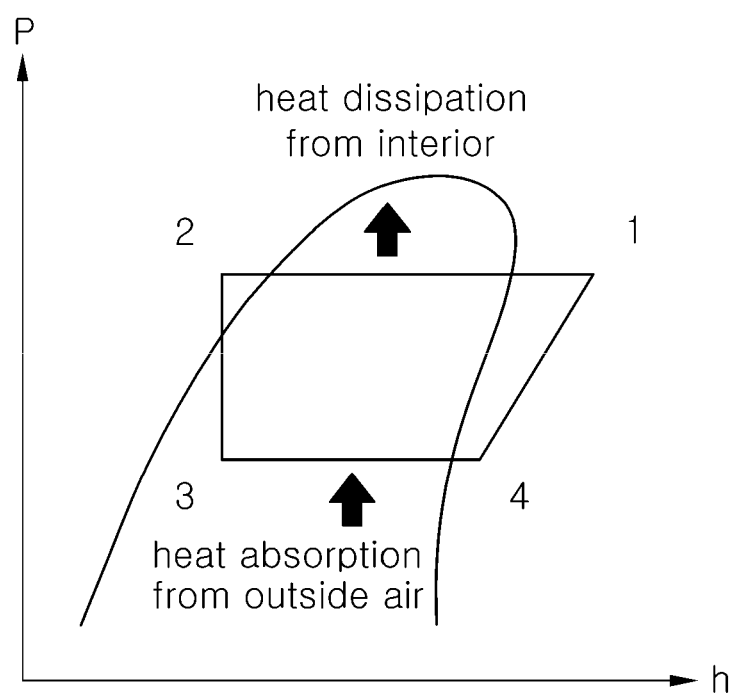

FIGS. 3 and 4 show a circuit diagram and a P-h line diagram according to a general heating mode of the gas injection type heat management system for the vehicle according to the exemplary embodiment of the present disclosure.

Further referring to FIGS. 3 and 4, in a general heating mode, the controller 600 may dissipate the heat in the inner condenser 120 by adjusting the opening amount of the first flow path valve 210, the second flow path valve 310, the third flow path valve 410, or the fourth flow path valve 510 to block the refrigerant of the base flow path 100 from flowing into the second bypass flow path 400 and flowing into the recirculation flow path 500, the first bypass flow path 300, or the heat exchange flow path 200 while the refrigerant is circulated in the base flow path 100.

In the general heating mode, the heating capacity may be supplied to the interior through the inner condenser 120 with the high-temperature/high-pressure refrigerant discharged from the compressor 110, and the refrigerant condensed by the inner condenser 120 may absorb heat from the outside air in the outer condenser 140 through the first expansion valve EXV1. The gaseous state refrigerant having passed through the outer condenser 140 may flow into the compressor 110 through the third expansion valve EXV3 and the evaporator 150.

Therefore, it is possible to increase the interior heating efficiency and save the energy consumption of a PTC heater using the heat source of the outside air while heating.

Figure 5:
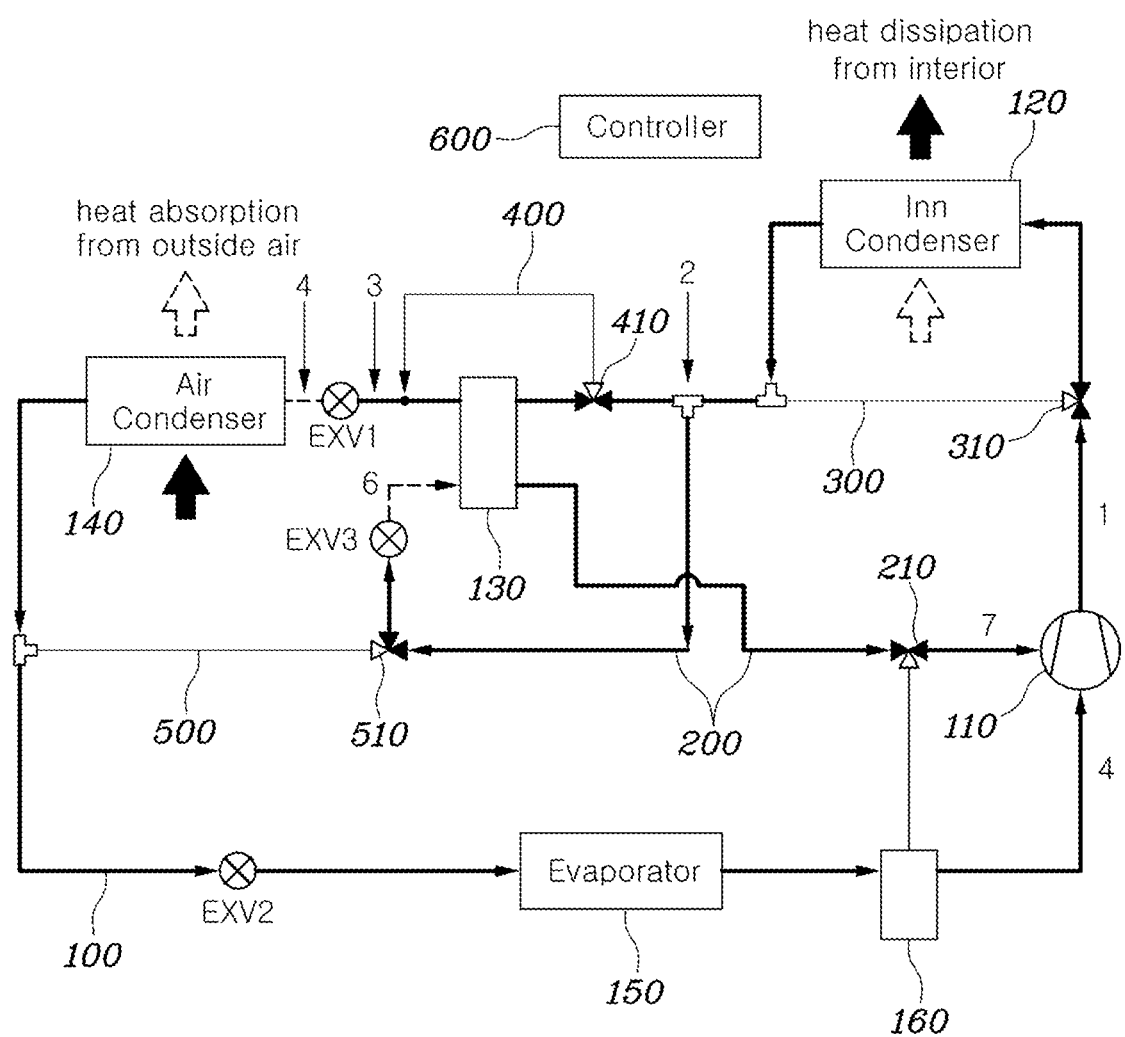
FIGS. 5 and 6 show a circuit diagram and a P-h line diagram according to a gas injection heating mode of the gas injection type heat management system for the vehicle according to the exemplary embodiment of the present disclosure.
Figure 6:
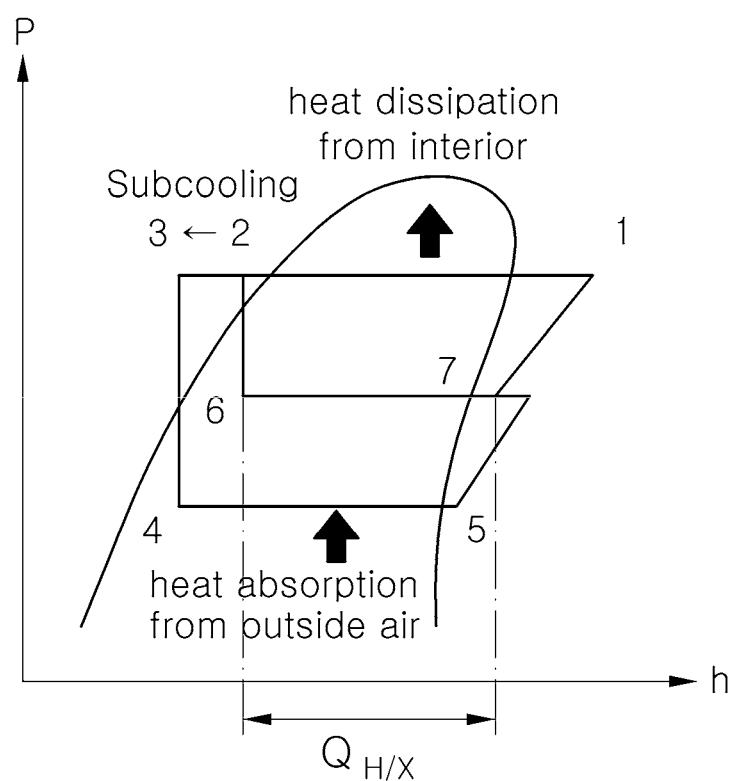

FIGS. 5 and 6 show a circuit diagram and a P-h line diagram according to a gas injection heating mode of the gas injection type heat management system for the vehicle according to the exemplary embodiment of the present disclosure.

Further referring to FIGS. 5 and 6, in a gas injection heating mode, the controller 600 may increase the flow rate of the refrigerant flowing into the inner condenser 120 by adjusting the opening amount of the first flow path valve 210, the second flow path valve 310, the third flow path valve 410, or the fourth flow path valve 510 so that the refrigerant of the base flow path 100 flows into the compressor 110 through the heat exchange flow path 200 while the refrigerant is circulated in the base flow path.

In the gas injection heating mode, the controller 600 may increase the flow rate of the refrigerant flowing into the inner condenser 120 using the heat exchanger 130.

Specifically, in the gas injection heating mode, the heating capacity may be supplied to the interior through the inner condenser 120 with the high-temperature/high-pressure refrigerant discharged from the compressor 110, and a part of the refrigerant condensed by the inner condenser 120 may directly flow into the heat exchanger 130 through the base flow path 100, and the remainder may be branched to the heat exchange flow path 120 to flow into the heat exchanger 130 in a state of being expanded through the third expansion valve EXV3.

Therefore, the refrigerant flowing into the heat exchanger 130 through the base flow path 100 may flow into the first expansion valve EXV1 and the outer condenser 140 in the cooled state so that super-cooling is secured by the heat exchange to absorb heat from the outside air. In addition, the refrigerant flowing into the heat exchanger 130 through the heat exchange flow path 200 may be heated by the heat exchange to flow into the compression intermediate region of the compressor 110.

Figure 7:
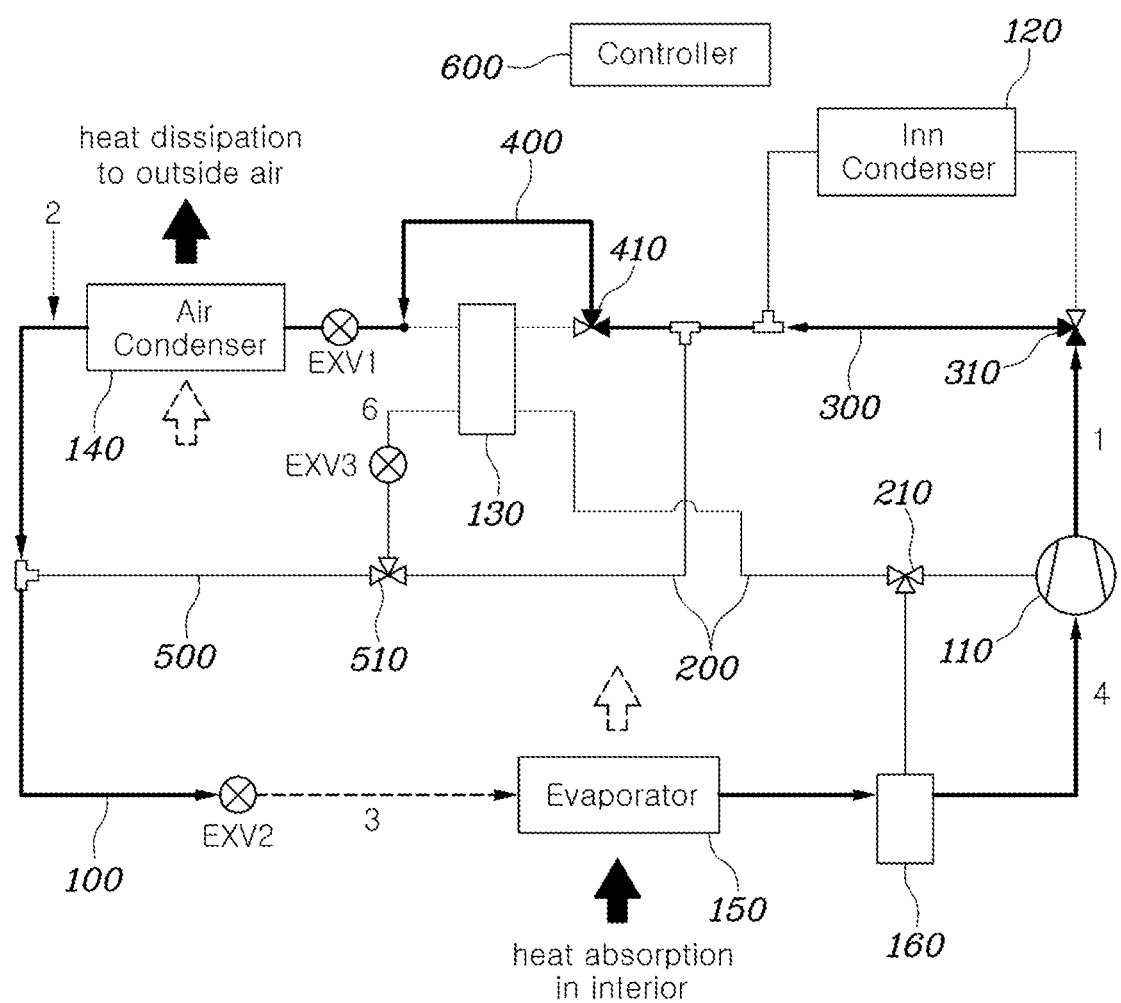
FIGS. 7 and 8 show a circuit diagram and a P-h line diagram according to a general cooling mode of the gas injection type heat management system for the vehicle according to the exemplary embodiment of the present disclosure.
Figure 8:
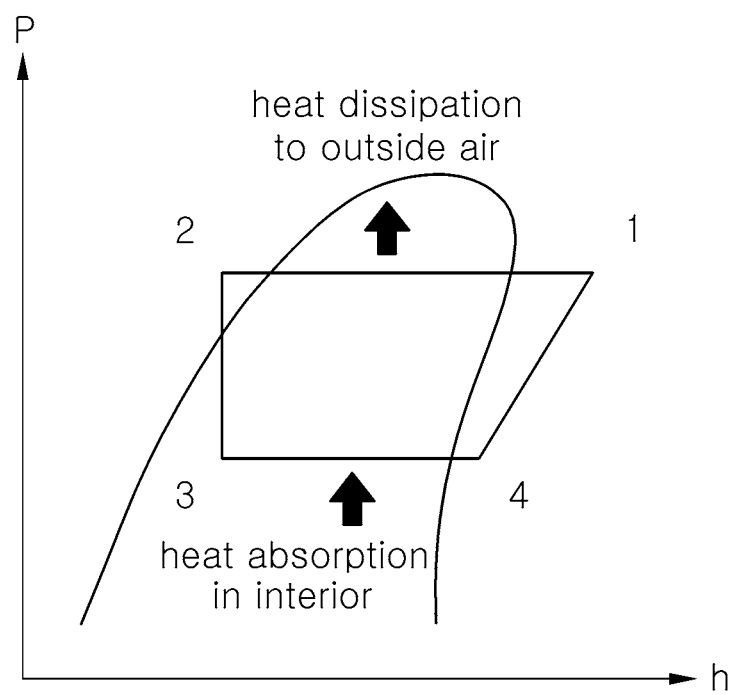

FIGS. 7 and 8 show a circuit diagram and a P-h line diagram according to a general cooling mode of the gas injection type heat management system for the vehicle according to the exemplary embodiment of the present disclosure.

Further referring to FIGS. 7 and 8, in a general cooling mode, the controller 600 may absorb heat in the evaporator 150 while dissipating heat in the outer condenser 140 by adjusting the opening amount of the first flow path valve 210, the second flow path valve 310, the third flow path valve 410, or the fourth flow path valve 510 so that the refrigerant of the base flow path 100 flows into the first bypass flow path 300 while the refrigerant is circulated in the base flow path 100.

Specifically, in the general cooling mode, the high-temperature/high-pressure refrigerant discharged from the compressor 110 may flow into the first bypass flow path 300 to bypass the inner condenser 120 and flow into the second bypass flow path 400 to bypass the heat exchanger 130, and then be condensed by the outer condenser 140 to dissipate heat to the outside air. The refrigerant having passed through the outer condenser 140 may flow into the evaporator 150 in a state of being expanded by the third expansion valve EXV3 to absorb heat from the air of the vehicle interior, and then flow into the entrance of the compressor 110.

Figure 9:
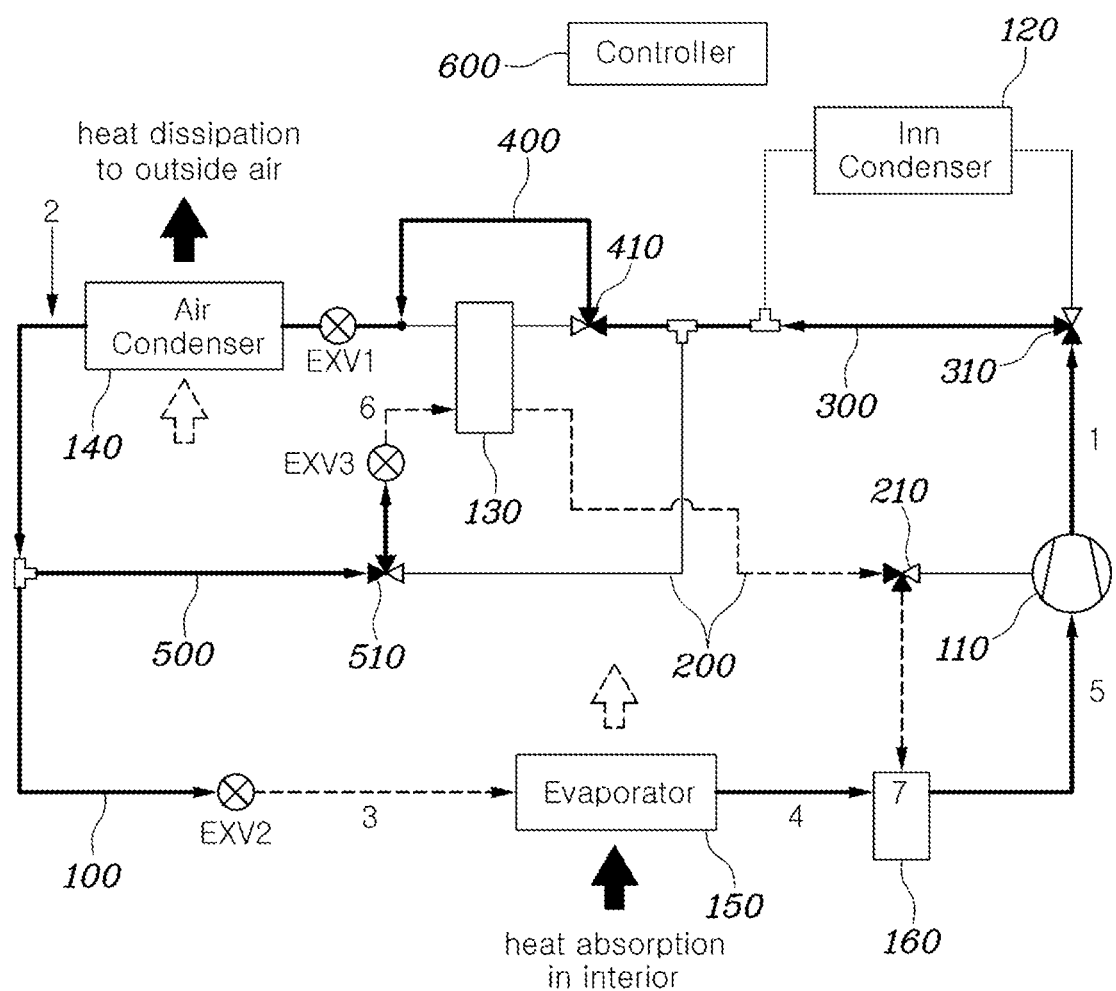
FIGS. 9 and 10 show a circuit diagram and a P-h line diagram according to a first liquid injection cooling mode of the gas injection type heat management system for the vehicle according to the exemplary embodiment of the present disclosure.
Figure 10:
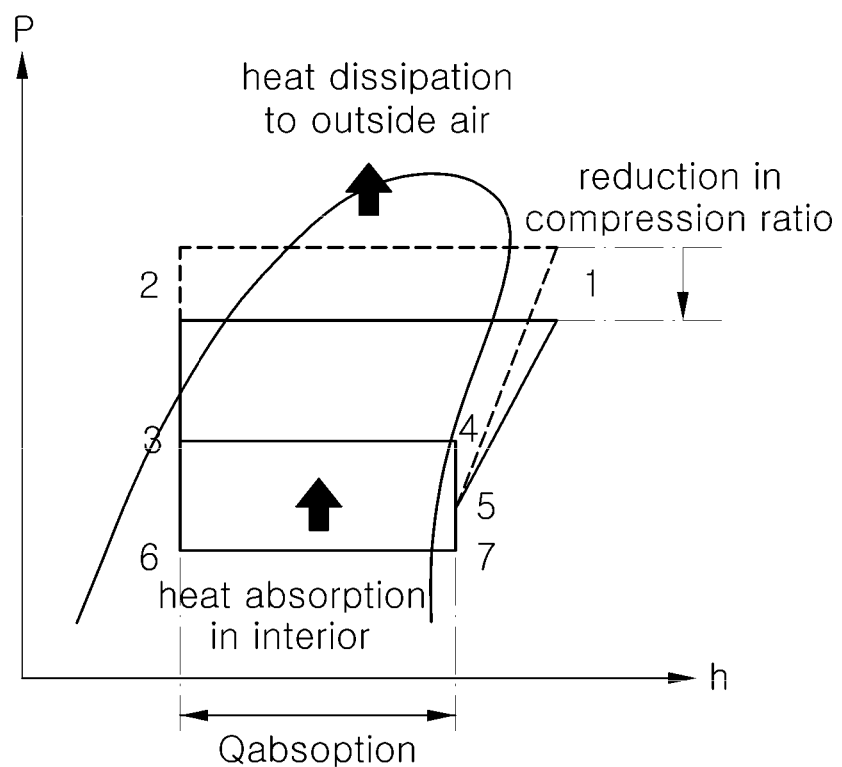

FIGS. 9 and 10 show a circuit diagram and a P-h line diagram according to a first liquid injection cooling mode of the gas injection type heat management system for the vehicle according to the exemplary embodiment of the present disclosure.

Further referring to FIGS. 9 and 10, in the first liquid injection cooling mode, the controller 600 may reduce the temperature of the refrigerant flowing into the compressor 110 by adjusting the opening amount of the first flow path valve 210, the second flow path valve 310, the third flow path valve 410, or the fourth flow path valve 510 so that the refrigerant of the base flow path 100 flows into the first bypass flow path 300 and the second bypass flow path 400 and flows into the upstream point of the compressor 110 through the recirculation flow path 500 and the heat exchange flow path 200 while the refrigerant is circulated in the base flow path 100.

Specifically, in a first liquid injection cooling mode, the high-temperature/high-pressure refrigerant discharged from the compressor 110 may flow into the first bypass flow path 300 to bypass the inner condenser 120 and flow into the second bypass flow path 400 to bypass the heat exchanger 130, and then dissipate heat to the outside air while passing through the first expansion valve EXV1 and the outer condenser 140. A part of the refrigerant having passed through the outer condenser 140 may flow into the third expansion valve EXV3 and the heat exchanger 130 through the heat exchange flow path 200 while flowing into the recirculation flow path 500, and the remainder may flow into the second expansion valve EXV2 and the evaporator 150 through the base flow path 100 to absorb heat from the air of the vehicle interior, and then flow into the entrance of the compressor 110.

Additionally, the controller 600 may control the fourth flow path valve 510 so that the refrigerant of the base flow path 100 having passed through the outer condenser 140 flows into the recirculation flow path 500 and the heat exchange flow path 200, so that a part of the refrigerant having passed through the outer condenser 140 may flow into the third expansion valve EXV3 through the recirculation flow path 500 to be expanded. The refrigerant expanded by the third expansion valve EXV3 may flow into the gas-liquid separator 160 through the heat exchanger 130. Therefore, the gaseous state refrigerant having passed through the third expansion valve EXV3 and the heat exchanger 130 may be supplied to the gas-liquid separator in the low-temperature state and may flow into the entrance of the compressor 110 in a state of being mixed with the refrigerant of the base flow path 100, thereby reducing the temperature of the refrigerant flowing into the compressor 110.

Therefore, in the first liquid injection cooling mode, the gaseous state refrigerant is supplied in the low-temperature state when the outside air is in a hot-season condition, thereby reducing the temperature of the refrigerant flowing into the compressor 110 to reduce a compression ratio, so that the load of the entire system may be reduced.

Figure 11:
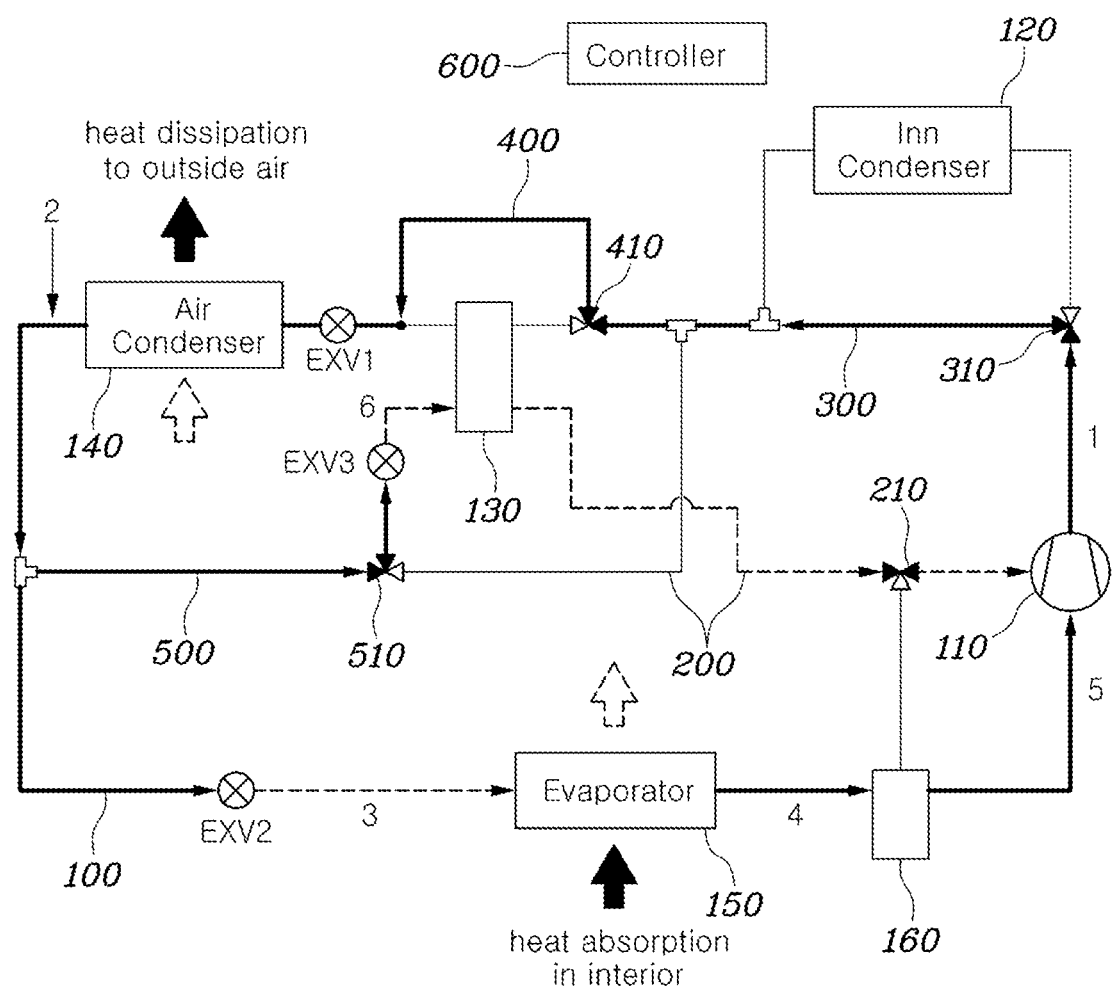
FIGS. 11 and 12 show a circuit diagram and a P-h line diagram according to a second liquid injection cooling mode of the gas injection type heat management system for the vehicle according to the exemplary embodiment of the present disclosure.
Figure 12:
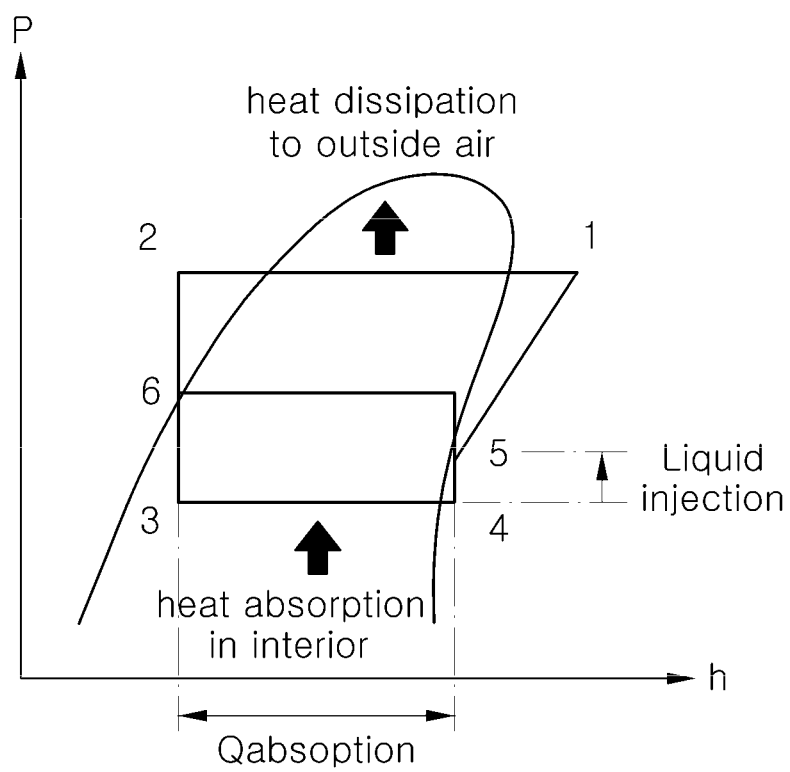

FIGS. 11 and 12 show a circuit diagram and a P-h line diagram according to a second liquid injection cooling mode of the gas injection type heat management system for the vehicle according to the exemplary embodiment of the present disclosure.

Further referring to FIGS. 11 and 12, in a second liquid injection cooling mode, the controller 600 may reduce the compression ratio of the compressor 110 by adjusting the opening amount of the first flow path valve 210, the second flow path valve 310, the third flow path valve 410, or the fourth flow path valve 510 so that the refrigerant of the base flow path 100 flows into the first bypass flow path 300 and the second bypass flow path 400 and flows into the compressor 110 through the recirculation flow path 500 and the heat exchange flow path 200 while the refrigerant is circulated in the base flow path 100.

Specifically, in the second liquid injection cooling mode, the high-temperature/high-pressure refrigerant discharged from the compressor 110 may flow into the first bypass flow path 300 to bypass the inner condenser 120 and flow into the second bypass flow path 400 to bypass the heat exchanger 130, and then dissipate heat to the outside air through the first expansion valve EXV1 and the outer condenser 140. The refrigerant having passed through the outer condenser 140 may flow into the evaporator 150 in a state of being expanded by the second expansion valve EXV2 to absorb heat from the air of the vehicle interior, and then flow into the entrance of the compressor 110.

Additionally, the controller 600 may control the fourth flow path valve 510 so that the refrigerant of the base flow path 100 having passed through the outer condenser 140 flows into the recirculation flow path 500 and the heat exchange flow path 200, so that a part of the refrigerant having passed through the outer condenser 140 may flow into the third expansion valve EXV3 through the recirculation flow path 500 to be expanded. The refrigerant expanded by the third expansion valve EXV3 may directly flow into the compressor 130 through the heat exchanger 130 through the heat exchange flow path 200. Therefore, the gaseous state refrigerant having passed through the third expansion valve EXV3 and the heat exchanger 130 may directly flow into the compression intermediate region of the compressor 110 in the low-temperature state, thereby reducing the compression ratio of the compressor 110.

Therefore, in the second liquid injection cooling mode, the gaseous state refrigerant may be directly supplied to the compressor 110 in the low-temperature state when the outside air is in a hot-season condition to reduce the compression ratio of the compressor 110, thereby reducing the load of the entire system.

Figure 13:
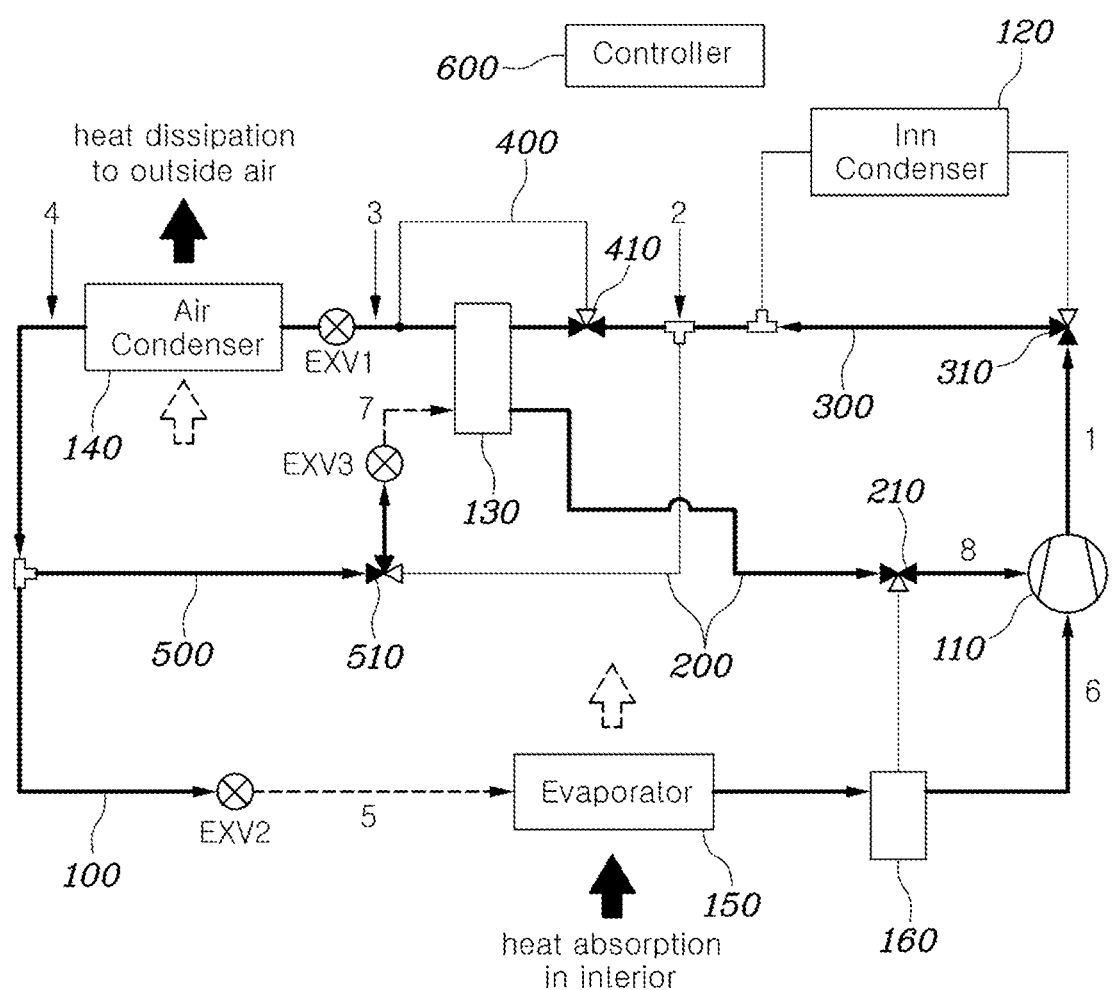
FIGS. 13 and 14 show a circuit diagram and a P-h line diagram according to a first sub-cooling cooling mode of the gas injection type heat management system for the vehicle according to the exemplary embodiment of the present disclosure.
Figure 14:
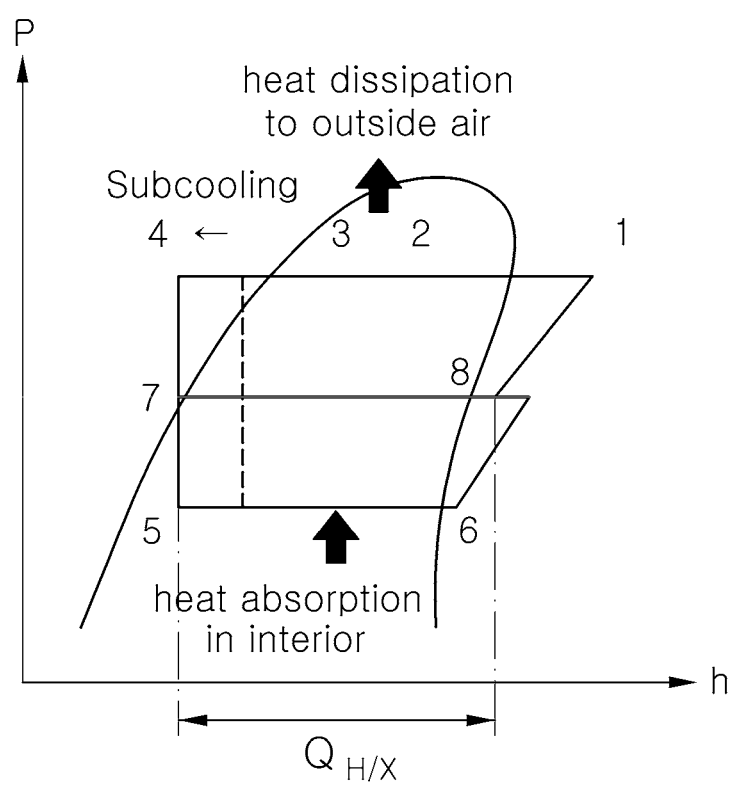

FIGS. 13 and 14 show a circuit diagram and a P-h line diagram according to a first sub-cooling cooling mode of the gas injection type heat management system for the vehicle according to the exemplary embodiment of the present disclosure.

Further referring to FIGS. 13 and 14, in a first sub-cooling cooling mode, the controller 600 may super-cool the refrigerant by adjusting the opening amount of the first flow path valve 210, the second flow path valve 310, the third flow path valve 410, or the fourth flow path valve 510 so that the refrigerant of the base flow path 100 flows into the first bypass flow path 300 and flows into the compressor 110 through the recirculation flow path 500 and the heat exchange flow path 200 while the refrigerant is circulated in the base flow path 100.

Specifically, in the first sub-cooling cooling mode, the high-temperature/high-pressure refrigerant discharged from the compressor 110 may flow into the first bypass flow path 300 to bypass the inner condenser 120 and be condensed while exchanging heat with the heat exchange flow path 200 in the heat exchanger 130 through the base flow path 100, and then dissipate heat to the outside air while being secondarily condensed through the first expansion valve EXV1 and the outer condenser 140.

A part of the refrigerant of the base flow path 100 having passed through the outer condenser 140 may be branched to the recirculation flow path 500 to flow into the heat exchange flow path 200. A small amount of refrigerant flowing into the heat exchange flow path 200 may become the gaseous state of the low-temperature state while passing through the third expansion valve EXV3 and directly flow into the compressor 110 after cooling the refrigerant of the base flow path 100 while passing through the heat exchanger 130.

Therefore, it is possible to additionally cool the refrigerant of the base flow path 100 having passed through the compressor 110 through the small amount of refrigerant flowing into the recirculation flow path 500 and the heat exchange flow path 200 to secure the super-cooling degree, thereby improving the cooling ability.

Figure 15:
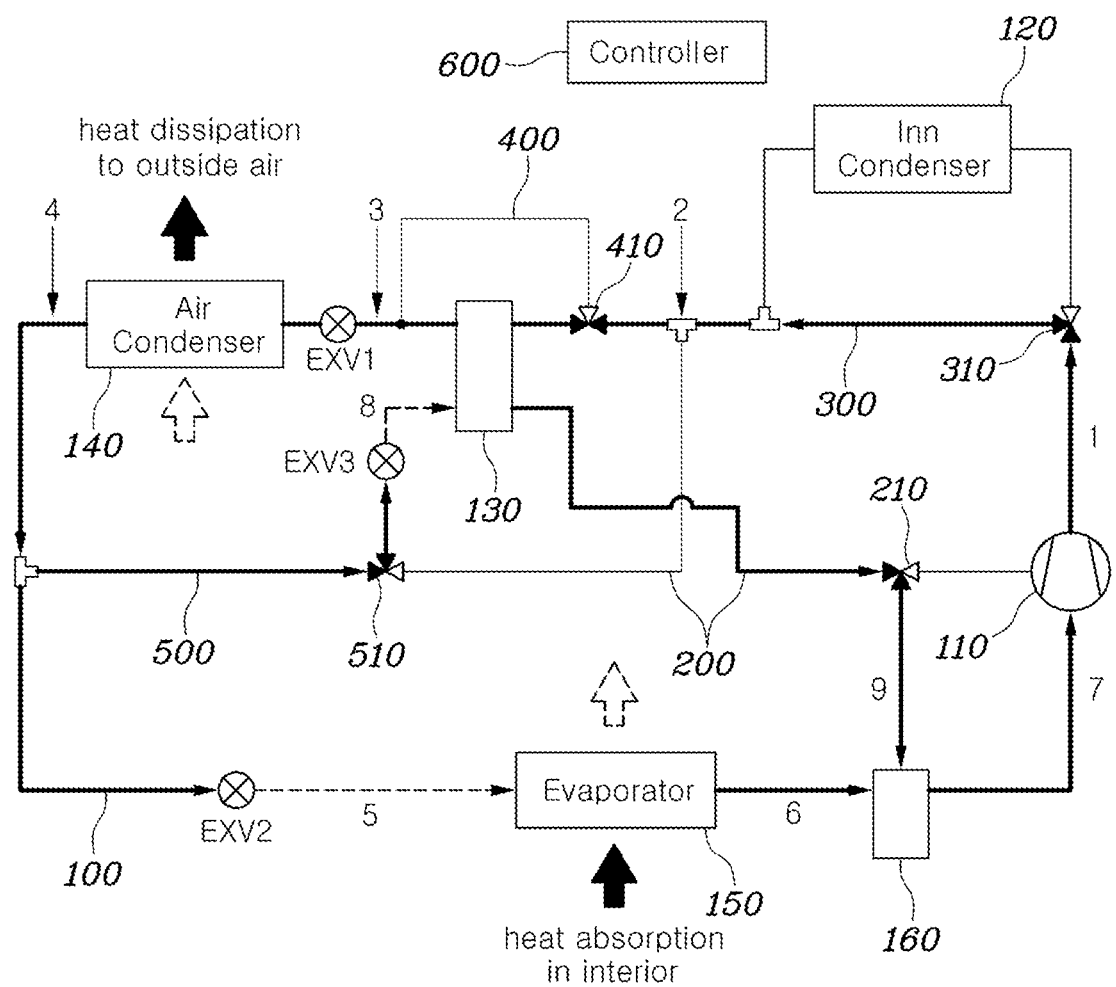
FIGS. 15 and 16 show a circuit diagram and a P-h line diagram according to a second sub-cooling cooling mode of the gas injection type heat management system for the vehicle according to the exemplary embodiment of the present disclosure.
Figure 16:
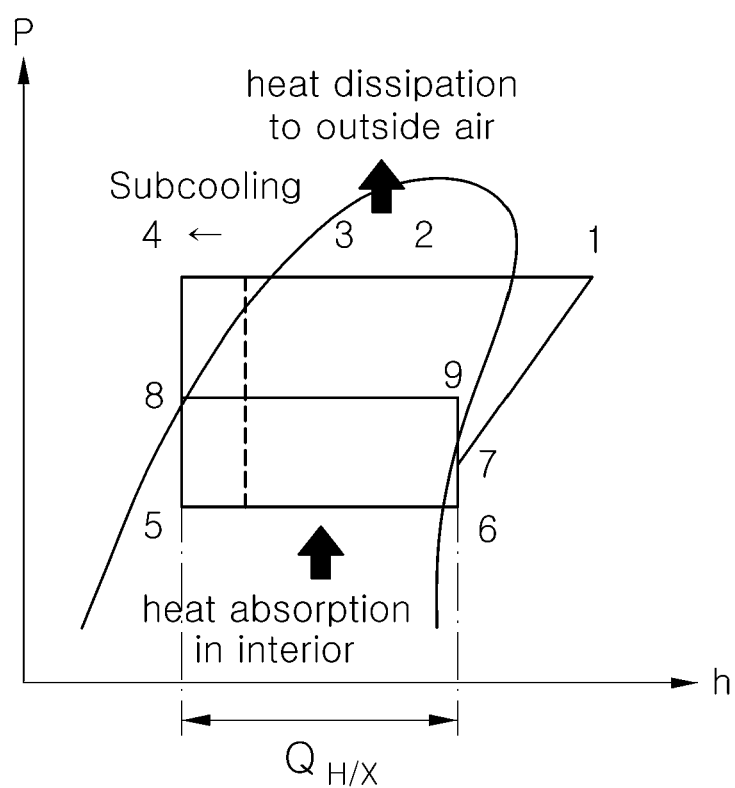

FIGS. 15 and 16 show a circuit diagram and a P-h line diagram according to a second sub-cooling cooling mode of the gas injection type heat management system for the vehicle according to the exemplary embodiment of the present disclosure.

Further referring to FIGS. 15 and 16, in a second sub-cooling cooling mode, the controller 600 may super-cool the refrigerant by adjusting the opening amount of the first flow path valve 210, the second flow path valve 310, the third flow path valve 410, or the fourth flow path valve 510 so that the refrigerant of the base flow path 100 flows into the first bypass flow path 300 and flows into the upstream point of the compressor 110 through the recirculation flow path 500 and the heat exchange flow path 200 while the refrigerant is circulated in the base flow path 100.

Specifically, in the second sub-cooling cooling mode, the high-temperature/high-pressure refrigerant discharged from the compressor 110 may flow into the first bypass flow path 300 to bypass the inner condenser 120 and be condensed while exchanging heat with the heat exchange flow path 200 in the heat exchanger 130 through the base flow path 100, and then dissipate heat to the outside air while being secondarily condensed through the first expansion valve EXV1 and the outer condenser 140.

A part of the refrigerant of the base flow path 100 having passed through the outer condenser 140 may be branched to the recirculation flow path 500 to flow into the heat exchange flow path 200. A small amount of refrigerant flowing into the heat exchange flow path 200 may become the gaseous state of the low-temperature state while passing through the third expansion valve EXV3 and flow into the gas-liquid separator 160 positioned at the upstream point of the compressor after cooling the refrigerant of the base flow path 100 while passing through the heat exchanger 130.

Therefore, it is possible to additionally cool the refrigerant of the base flow path 100 having passed through the compressor 110 through the small amount of refrigerant flowing into the recirculation flow path 500 and the heat exchange flow path 200 to secure the super-cooling degree, thereby improving the cooling ability.

Although the specific exemplary embodiments of the present disclosure have been shown and described, it will be apparent to those skilled in the art that the present disclosure may be variously improved and changed without departing from the technical spirit of the present disclosure provided by the appended claims.

The invention claimed is:
1. A gas injection type heat management system for a vehicle comprising:
  a base flow path sequentially provided with a compressor, an inner condenser, a heat exchanger, a first expansion valve, an outer condenser, a second expansion valve, and an evaporator to flow refrigerant;
  a heat exchange flow path branched from the base flow path at an upstream point of the heat exchanger, disposed to be heat-exchangeable with the base flow path in the heat exchanger by passing through a third expansion valve, and joined to the base flow path on the compressor or at an upstream point of the compressor;
  a first bypass flow path connected to the base flow path to bypass the inner condenser between upstream and downstream points of the inner condenser;
  a second bypass flow path connected to the base flow path to bypass the heat exchanger between the upstream point and a downstream point of the heat exchanger; and a recirculation flow path branched from the base flow path at a downstream point of the outer condenser, and joined to the heat exchange flow path at an upstream point of the third expansion valve.

2. The gas injection type heat management system of claim 1, further comprising: a gas-liquid separator provided between the evaporator and the compressor of the base flow path to separate the refrigerant into a gaseous state and a liquid state,
wherein the heat exchange flow path is branched to the gas-liquid separator and the compressor and joined to the base flow path.

3. The gas injection type heat management system of claim 1,
wherein the compressor is a 2-stage compressive compressor in which the gaseous state refrigerant is additionally injected into a compression intermediate region to mix the refrigerant, and
wherein the heat exchange flow path is connected to the compressor so that the refrigerant is additionally injected to the compression intermediate region.

4. The gas injection type heat management system of claim 1, further comprising:
a first flow path valve provided at a point branched to the compressor and the upstream point of the compressor of the heat exchange flow path to adjust the presence or absence of the flow or the flow rate of the refrigerant each flowing into the compressor and the upstream point of the compressor;
a second flow path valve provided at a point branched from the base flow path to the first bypass flow path or a point where the first bypass flow path is joined to the base flow path to adjust the presence or absence of the flow or the flow rate of the refrigerant flowing into the first bypass flow path;
a third flow path valve provided at a point branched from the base flow path to the second bypass flow path or a point where the second bypass flow path is joined to the base flow path to adjust the presence or absence of the flow or the flow rate of the refrigerant each flowing into the second bypass flow path; and
a fourth flow path valve provided at a point where the recirculation flow path is joined to the heat exchange flow path to adjust the presence or absence of the flow or the flow rate of the refrigerant flowing through the heat exchange flow path or the refrigerant flowing from the recirculation flow path to the heat exchange flow path.

5. The gas injection type heat management system of claim 4, further comprising: a controller configured to control the operation of the compressor, to control whether the refrigerant flows or expands by adjusting an opening amount of the first expansion valve, the second expansion valve, or the third expansion valve, and to adjust the presence or absence of the flow or the flow rate of the refrigerant in the base flow path, the heat exchange flow path, the first bypass flow path, the second bypass flow path, or the recirculation flow path by adjusting an opening amount of the first flow path valve, the second flow path valve, the third flow path valve, or the fourth flow path valve.

6. The gas injection type heat management system of claim 5, wherein in a general heating mode, the controller is configured to dissipate heat in an inner condenser by adjusting the opening amount of the first flow path valve, the second flow path valve, the third flow path valve, or the fourth flow path valve to block the refrigerant of the base flow path from flowing into the second bypass flow path and flowing into the recirculation flow path, the first bypass flow path, or the heat exchange flow path while the refrigerant is circulated in the base flow path.

7. The gas injection type heat management system of claim 5, wherein in a gas injection heating mode, the controller is configured to increase the flow rate of the refrigerant flowing into the inner condenser by adjusting the opening amount of the first flow path valve, the second flow path valve, the third flow path valve, or the fourth flow path valve so that the refrigerant of the base flow path flows into the compressor through the heat exchange flow path while the refrigerant is circulated in the base flow path.

8. The gas injection type heat management system of claim 5, wherein in a general cooling mode, the controller is configured to absorb heat in the evaporator while dissipating the heat in the outer condenser by adjusting the opening amount of the first flow path valve, the second flow path valve, the third flow path valve, or the fourth flow path valve so that the refrigerant of the base flow path flows into the first bypass flow path while the refrigerant is circulated in the base flow path.

9. The gas injection type heat management system of claim 5, wherein in a first liquid injection cooling mode, the controller is configured to reduce the temperature of the refrigerant flowing into the compressor by adjusting the opening amount of the first flow path valve, the second flow path valve, the third flow path valve, or the fourth flow path valve so that the refrigerant of the base flow path flows into the first bypass flow path and the second bypass flow path and flows into an upstream point of the compressor through the recirculation flow path and the heat exchange flow path while the refrigerant is circulated in the base flow path.

10. The gas injection type heat management system of claim 5, wherein in a second liquid injection cooling mode, the controller is configured to reduce a compression ratio of the compressor by adjusting the opening amount of the first flow path valve, the second flow path valve, the third flow path valve, or the fourth flow path valve so that the refrigerant of the base flow path flows into the first bypass flow path and the second bypass flow path and flows into the compressor through the recirculation flow path and the heat exchange flow path while the refrigerant is circulated in the base flow path.

11. The gas injection type heat management system of claim 5, wherein in a first sub-cooling cooling mode, the controller is configured to super-cool the refrigerant by adjusting the opening amount of the first flow path valve, the second flow path valve, the third flow path valve, or the fourth flow path valve so that the refrigerant of the base flow path flows into the first bypass flow path and flows into the compressor through the recirculation flow path and the heat exchange flow path while the refrigerant is circulated in the base flow path.

12. The gas injection type heat management system of claim 5, wherein in a second sub-cooling cooling mode, the controller is configured to super-cool the refrigerant by adjusting the opening amount of the first flow path valve, the second flow path valve, the third flow path valve, or the fourth flow path valve so that the refrigerant of the base flow path flows into the first bypass flow path and flows into an upstream point of the compressor through the recirculation flow path and the heat exchange flow path while the refrigerant is circulated in the base flow path.

* * * * *